US010721717B2

(12) United States Patent
Gholmieh et al.

(10) Patent No.: US 10,721,717 B2
(45) Date of Patent: Jul. 21, 2020

(54) BAND COMBINATION CONSTRAINT ON THE NUMBER OF SUPPORTED LAYERS

(71) Applicant: QUALCOMM Incorporated, San Diego, CA (US)

(72) Inventors: Aziz Gholmieh, Del Mar, CA (US); Alexei Yurievitch Gorokhov, San Diego, CA (US); Peter Gaal, San Diego, CA (US); Vishal Mahajan, Newark, CA (US); Valentin Alexandru Gheorghiu, Tokyo (JP); Hari Sankar, San Diego, CA (US); Masato Kitazoe, Hachiouji (JP)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/198,224

(22) Filed: Nov. 21, 2018

(65) Prior Publication Data

US 2019/0166586 A1 May 30, 2019

Related U.S. Application Data

(60) Provisional application No. 62/591,537, filed on Nov. 28, 2017.

(51) Int. Cl.
*H04W 72/04* (2009.01)
*H04L 12/24* (2006.01)
(Continued)

(52) U.S. Cl.
CPC .......... *H04W 72/04* (2013.01); *H04B 7/0413* (2013.01); *H04L 5/001* (2013.01);
(Continued)

(58) Field of Classification Search
CPC .. H04W 24/10; H04W 72/042; H04B 7/0413; H04L 5/001; H04L 5/0092
See application file for complete search history.

(56) References Cited

U.S. PATENT DOCUMENTS 9,226,290 B2 * 12/2015 Gaal ................. H04W 72/0446
2012/0113866 A1 * 5/2012 Tenny ................... H04W 24/10
370/254

(Continued)

OTHER PUBLICATIONS

Ericsson: "UE Capability for NR UE Performance," 3GPP Draft; R4-1701782, vol. RAN WG4, No. Berlin, Germany; Aug. 21, 2017—Aug. 25, 2017, Aug. 20, 2017, XP051320451, 3 pages, Retrieved from the Internet: URL: http://www.3gpp.org/ftp/Meetings_3GPP_SYNC/RAN4/Docs/ [retrieved on Aug. 20, 2017] sections 1-3.

(Continued)

*Primary Examiner* — Wei Zhao

(74) *Attorney, Agent, or Firm* — Arent Fox LLP

(57) ABSTRACT

The disclosure relates to reduced signaling to carry out the linking between new radio (NR) carrier aggregation (CA) band combinations and NR band processing combinations (BPCs), and includes apparatus and methods of receiving, at a modem of a user equipment (UE), a UE configuration from a base station based on UE band combination constraint information, configuring the UE, by a processor of the UE, according to the UE configuration, and performing a communication with the base station, via the modem of the UE, according to the UE configuration. In an implementation, the disclosure includes transmitting the UE band combination constraint information, such as in the form of receiving a total number of layers supported in a CA band combination, and wherein receiving the UE configuration further com- (Continued)

prises receiving a CA combination and a BPC configuration in response to the UE band combination constraint information.

28 Claims, 7 Drawing Sheets

(51) Int. Cl.
    *H04B 7/0413*     (2017.01)
    *H04L 5/00*     (2006.01)
    *H04W 88/08*     (2009.01)
    *H04W 88/02*     (2009.01)
    *H04W 8/24*     (2009.01)
    *H04L 27/00*     (2006.01)

(52) U.S. Cl.
    CPC ............ *H04L 5/0092* (2013.01); *H04L 41/08* (2013.01); *H04W 72/042* (2013.01); *H04L 27/0006* (2013.01); *H04W 8/24* (2013.01); *H04W 72/048* (2013.01); *H04W 88/02* (2013.01); *H04W 88/08* (2013.01)

(56) References Cited

U.S. PATENT DOCUMENTS

2015/0163029 A1\*   6/2015   Murakami .......... H04L 27/2627
                                                                   370/476
2017/0111910 A1     4/2017   Sundar et al.

OTHER PUBLICATIONS

International Search Report and Written Opinion—PCT/US2018/062484—ISA/EPO—dated Mar. 18, 2019.
Qualcomm Incorporated: "UE Capability Structure of NR and MR-DC," 3GPP Draft; R2-1712369, vol. RAN WG2, No. Reno, Nevada, USA; Nov. 27, 2017—Dec. 1, 2017, Nov. 17, 2017, XP051371437, 5 pages, Retrieved from the Internet: URL: http://www.3gpp.org/ftp/tsg_ran/WG2_RL2/TSGR2_100/Docs/ [retrieved on Nov. 17, 2017], Sections 1-3, Sections 2.1, 2.2.

\* cited by examiner

US 10,721,717 B2

BAND COMBINATION CONSTRAINT ON THE NUMBER OF SUPPORTED LAYERS

CROSS-REFERENCE TO RELATED APPLICATION

This application claims the benefit of U.S. Provisional Application Ser. No. 62/591,537, entitled "BAND COMBINATION CONSTRAINT ON THE NUMBER OF SUPPORTED LAYERS" and filed on Nov. 28, 2017, which is expressly incorporated by reference herein in its entirety.

BACKGROUND

Aspects of the present disclosure relate generally to wireless communication networks, and more particularly, to linking between carrier aggregation (CA) band combinations and band processing combinations (BPCs).

Wireless communication networks are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, orthogonal frequency-division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as new radio (NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information. As the demand for mobile broadband access continues to increase, however, further improvements in NR communications technology and beyond may be desired.

For example, for NR communications technology and beyond, current proposals call for reducing network overhead by reducing the number or the size of signaling transmissions. One such area where excessive signaling may exist is signaling related to linking between NR CA band combinations and NR BPCs. Thus, improvements in wireless communication operations may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. The sole purpose of the summary is to present some concepts of one or more aspects in a simplified form as a prelude to the more detailed description that is presented later.

In an aspect, the present disclosure relates to reduced signaling to carry out the linking between new radio (NR) carrier aggregation (CA) band combinations and NR band processing combinations (BPCs).

In an implementation, the present disclosure relates to a method of wireless communication by a user equipment including receiving, at a modem of the UE from a base station, a UE configuration based on UE band combination constraint information, the UE configuration including a carrier aggregation combination and BPC configuration, and performing a communication with the base station, via the modem of the UE, according to the carrier aggregation combination and BPC configuration.

In another implementation, the present disclosure relates to a wireless communication device, including a modem, a memory storing instructions, and a processor in communication with the modem and the memory. The processor may be configured to execute the instructions to receive, at the modem from a base station, a UE configuration based on UE band combination constraint information, the UE configuration including a carrier aggregation combination and BPC configuration. The processor may also be configure to execute the instructions to configure the UE according to the carrier aggregation combination and BPC configuration. The processor may further be configure to execute the instructions to perform a communication with the base station, via the modem, according to the carrier aggregation combination and BPC configuration.

In another implementation, the present disclosure relates to a wireless communication device including means for receiving, from a base station, a UE configuration based on UE band combination constraint information, the UE configuration including a carrier aggregation combination and BPC configuration. The wireless communication device may also include means for configuring the UE according to the carrier aggregation combination and BPC configuration. The wireless device may further include means for performing a communication with the base station according to the carrier aggregation combination and BPC configuration.

In another implementation, the present disclosure relates to a computer-readable medium storing computer code executable by a processor for wireless communications by a UE. The code may include code for receiving, at a modem of the UE from a base station, a UE configuration based on UE band combination constraint information, the UE configuration including a carrier aggregation combination and BPC configuration. The code may also include code for configuring the UE, by a processor of the UE, according to the carrier aggregation combination and BPC configuration. The code may further include code for performing a communication with the base station, via the modem of the UE, according to the carrier aggregation combination and BPC configuration.

In another implementation, the present disclosure relates to a method of wireless communication by a base station including generating, at a processor of the base station, a UE configuration based on UE band combination constraint information, the UE configuration including a carrier aggregation combination and BPC configuration, transmitting the UE configuration, via a modem of the base station, to the UE, and performing a communication with the UE, via the modem of the base station, according to the carrier aggregation combination and BPC configuration.

In another implementation, the present disclosure relates to a wireless communication device including a modem, a memory storing instructions, and a processor in communication with the modem and the memory. The processor may be configured to execute the instructions to generate a UE configuration based on UE band combination constraint information, the UE configuration including a carrier aggregation combination and BPC configuration. The processor may also be configured to execute the instructions to transmit the UE configuration to the UE. The processor may further be configured to execute the instructions to perform a communication with the UE according to the carrier aggregation combination and BPC configuration.

In another implementation, the present disclosure relates to a wireless communication device including means for generating a UE configuration based on UE band combination constraint information, the UE configuration including a carrier aggregation combination and BPC configuration. The wireless communication device may also include means for transmitting the UE configuration to the UE. The wireless device may further include means for performing a communication with the UE according to the carrier aggregation combination and BPC configuration.

In another implementation, the present disclosure relates to a computer-readable medium storing computer code executable by a processor for wireless communications by a UE. The code may include code for generating, at a processor of the base station, a user equipment (UE) configuration based on UE band combination constraint information, the UE configuration including a carrier aggregation combination and BPC configuration. The code may also include code for transmitting the UE configuration, via a modem of the base station, to the UE. The code may further include code for performing a communication with the UE, via the modem of the base station, according to the carrier aggregation combination and BPC configuration.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
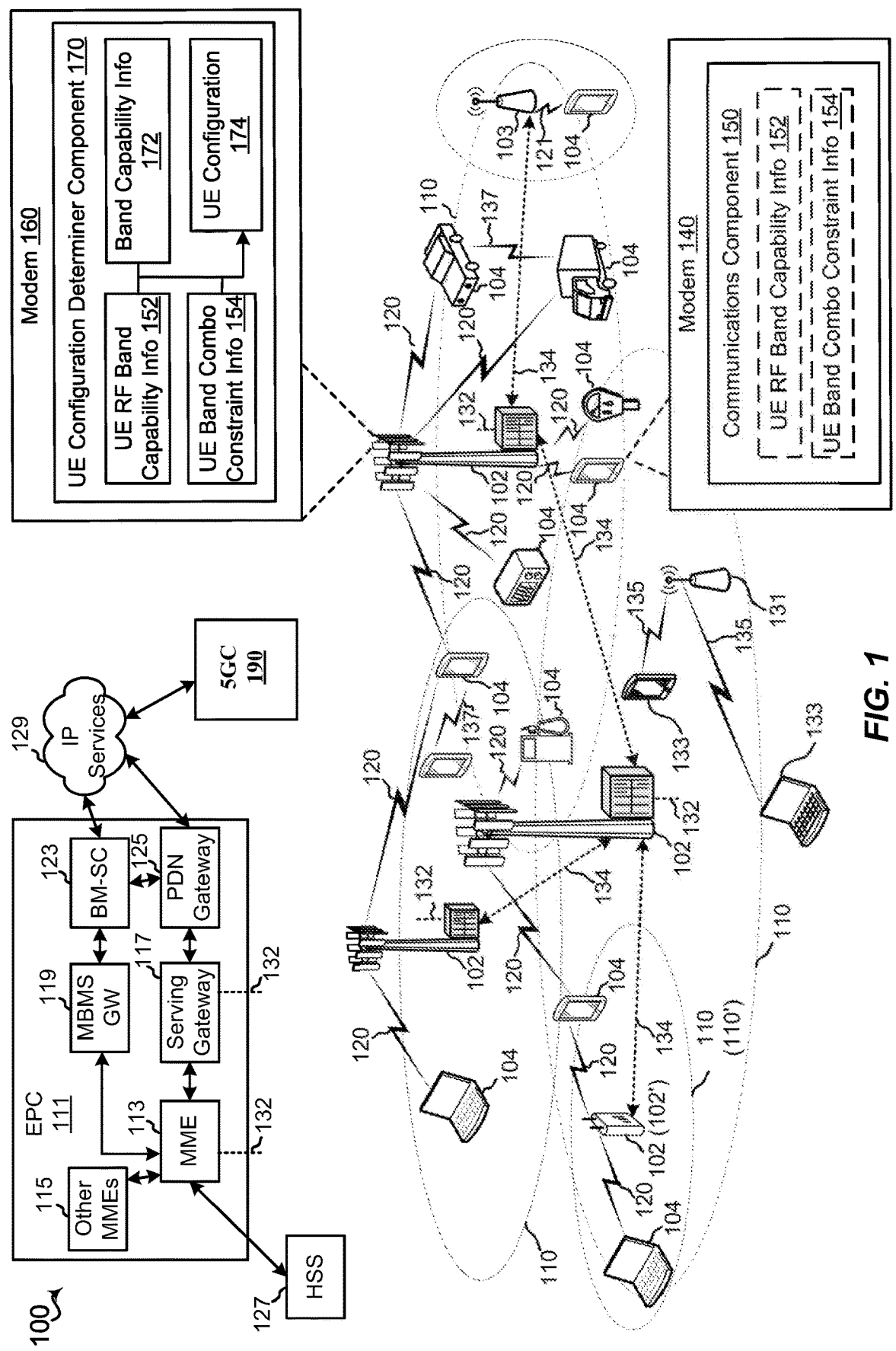
FIG. 1 is a schematic diagram of a wireless communication network including at least one user equipment (UE) having a communications component configured according to this disclosure to reduce signaling, for example, via signalling a total number of layers supported in a carrier aggregation (CA) band combination to reflect radio frequency (RF) implementation limitations.

The present disclosure generally relates to reduced signaling to carry out the linking between new radio (NR) carrier aggregation (CA) band combinations and NR band processing combinations (BPCs). In particular, due to user equipment (UE) radio frequency (RF) capability limitations, in some cases, certain combinations of CA band combinations and BPCs may not be able to be supported by the UE. Further, signaling such exceptions as a multiple input multiple output (MIMO) capability per component carrier (CC) in a CA band combination may result in an increase in the signaling, as the exception may have to be repeated multiple times.

The UE RF capability limitations may be based on a UE hardware configuration, such as but not limited to an RF front end component. For example, multiple bands might connect to an antenna through a diplexer or through a switch. The diplexer distributes the signals to both branches simultaneously while the switch just connects one of the branches. In a simple example, but not limited hereto, assume a UE can support Band 1 (B1) and Band 2 (B2) and has 4 receivers on each band, where the UE includes 4 antenna but 6 receivers in total. In this case, 2 of the B1 receivers and 2 of the B2 receivers are connected to 2 antennas through a diplexer so they can receive signals at the same time. The other 2 receivers of B1 and B2 are connected to antennas through switches so they cannot receiver signals at the same time. As such, in this case, the total number of receivers when aggregating B1 and B2 is 6. The UE RF capability limitations with respect to the linking between NR CA band combinations and NR BPCs may be a highly complicated problem, as the number of different bands in NR is expected to be significantly greater than in current communications, such as long term evolution (LTE).

In general, the UE RF constraints are applicable to only a subset of use cases, and may be expressed by an additional constraint on only a subset of RF bands. Specifically, in one implementation, the UE can signal the total number of layers supported in a CA band combination to reflect RF implementation limitations. This limitation also applies when those bands are combined with other bands to form a bigger CA band combination. While this implementation utilizes UE signalling, a base station may acquire this information in other manners, such as via stored or retrieved UE band combination constraint information based on UE identification (ID) information.

Alternatively, or in addition, the present disclosure includes a rule, for UE configuration, that a given BPC is applicable to CA band combinations that include bands: 1) with equal or higher bandwidth (BW) class per band combination, 2) with equal or higher MIMO layer capability per band, and 3) with equal or higher MIMO layer capability per (sub)-band combination when applicable.

As a result, the base station can account for the UE RF constraints when configuring the UE for carrier aggregation and band communications. For instance, the base station can configure the UE with a UE configuration that includes one or more CA combination and a BPC configurations that are supported by the capabilities of the UE. In some examples, the band capabilities or feature sets may include both baseband capabilities and/or non-baseband capabilities.

Additional features of the present aspects are described in more detail below with respect to FIGS. 1-7. Various aspects are now described with reference to the drawings. In the following description, for purposes of explanation, numerous specific details are set forth in order to provide a thorough understanding of one or more aspects. In some examples, however, such aspect(s) may be practiced without these specific details. Additionally, the term "component" as used herein may be one of the parts that make up a system, may be hardware, firmware, and/or software stored on a computer-readable medium, and may be divided into other components.

The techniques described herein may be used for various wireless communication networks such as NR, 5G, CDMA, TDMA, FDMA, OFDMA, SC-FDMA, TD-SCDMA and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an NR system for purposes of example, and LTE terminology is used in much of the description below, although the techniques are applicable beyond LTE applications (e.g., to NR/5G networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Referring to FIG. 1, in accordance with various aspects of the present disclosure, an example wireless communication access network 100 includes at least one UE 104 with a modem 140 having a communications component 150 that receives a UE configuration 174 from at least one base station 102, wherein the UE configuration 174 takes into account UE band combination ("combo") constraint information 154 that may limit linking one or more possible CA band combinations with one or more possible BPCs. For example, the UE band combo constraint information 154 may include, but is not limited to, a total number of layers supported in a respective CA band combination. In other words, the base station 102 may provide the UE 104 with the UE configuration 174 that establishes one or more CA combination and BPC configurations, such as one or more CA band combination-BPC linkages, that are fully supported by the UE 104. Such fully supported configuration(s), for example, are configurations that do not conflict with an RF limitation of the UE 104, and are identified by the base station 102 based on removing one or more possible CA band combination-BPC linkage permutations from consideration based on the UE band combo constraint information 154. Additionally, in some cases, the UE 104 may signal the UE band combo constraint information 154 to the base station 102 along with the UE RF band capability information 152. For example, the UE RF band capability information 152 may include, but is not limited to, a plurality of CA band combinations that can be supported by the UE 104. In an aspect, the UE 104 may signal the UE band combo constraint information 154, and/or the UE RF band capability information 152, to the base station 102, while in other cases the base station 102 may be able to determine or otherwise acquire the UE band combo constraint information 154 and/or the UE RF band capability information 152 based on receiving an identification of the UE 104.

Further, the at least one base station 102 includes a modem 160 having a UE configuration determiner component 170 that identifies linkages between CA band combinations and BPCs based on UE band combo constraint information 154. In particular, the UE configuration determiner component 170 can generate a plurality of usable UE CA band combinations based on the received UE RF band capability information 152 and the received UE band combo constraint information 154. In other words, the plurality of usable UE CA band combinations may be less than a total number of possible permutations of CA band combinations, as certain sets of CA band combinations may be incompatible for use together based on UE RF limitations represented by the UE band combo constraint information 154. Consequently, the UE configuration determiner component 170 determines linkages between one or more of the plurality of usable UE CA band combinations and one or more BPCs based on the band capability information 172, which includes, but may not be limited to, the BPC capability. As such, the base station 102 can configure the UE 104 with the UE configuration 174, such as but not limited to an RRC connection configuration, based on a selected one or more of the determined CA band combo-BPC linkages for enabling communications between the UE 104 and the base station 102.

Thus, according to the present disclosure, network overhead can be reduced by as a result of the UE 104 transmitting the UE band combo constraint information 154, e.g., as compared to the UE 104 signalling MIMO capability per CC in CA band combination capability in exceptional cases where a BPC cannot properly reflect RF implementation limitations of the UE 104.

In wireless communication access network 100, also referred to as a wireless wide area network (WWAN), the one or more UEs 104 and/or the one or more base stations 102 may communicate with other UEs and/or other base stations via an Evolved Packet Core (EPC) 111 and/or a 5G Core (5GC) 190. The base stations 102 (collectively referred to as Evolved Universal Mobile Telecommunications System (UMTS) Terrestrial Radio Access Network (E-UTRAN)) interface with the EPC 111 and/or the 5GC 190 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 111 and/or the 5GC 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, a small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). Communication links 120 between the base stations 102 and the UEs 104 may include uplink (UL) (also referred to as reverse link) transmissions from the UE 104 to the base station 102 and/or downlink (DL) (also referred to as forward link) transmissions from the base station 102 to the UE 104. The communication links 120 may use MIMO antenna technology, including spatial multiplexing, beamforming, and/or transmit diversity. The communication links 120 may be through one or more carriers. The base stations 102/UEs 104 may use spectrum up to Y MHz (e.g., 5, 10, 15, 20, 100 MHz) BW per carrier allocated in a carrier aggregation of up to a total of Y*x MHz (where x is a number of CCs) used for transmission in each direction. The carriers may or may not be adjacent to or contiguous with each other. Allocation of carriers may be asymmetric with respect to DL and UL (e.g., more or less carriers may be allocated for DL than for UL). The CCs may include a primary CC and one or more secondary CCs. A primary CC may be referred to as a primary cell (PCell) and a secondary CC may be referred to as a secondary cell (SCell).

Certain UEs 104 may communicate with each other using a device-to-device (D2D) communication link 137. The D2D communication link 137 may use the DL/UL WWAN spectrum. The D2D communication link 137 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). A D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications access network 100 may further include a Wi-Fi access point (AP) 131 in communication with Wi-Fi stations (STAs) 133 via communication links 135 in a 5 GHz unlicensed frequency spectrum. When communicating in an unlicensed frequency spectrum, the STAs 133/AP 131 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 131. The small cell 102', employing NR in an unlicensed frequency spectrum, may boost coverage to and/or increase capacity of the access network.

The wireless communications access network 100 may further include a gNodeB (gNB) 103 that may operate in millimeter wave (mmW) frequencies and/or near mmW frequencies in communication with the UE 104. When the gNB 103 operates in mmW or near mmW frequencies, the gNB 103 may be referred to as a mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have extremely high path loss and a short range. The mmW base station 103 may utilize beamforming 121 with the UE 104 to compensate for the extremely high path loss and short range.

The EPC 111 may include a Mobility Management Entity (MME) 113, other MMES 115, a Serving Gateway 117, a Multimedia Broadcast Multicast Service (MBMS) Gateway 119, a Broadcast Multicast Service Center (BM-SC) 123, and a Packet Data Network (PDN) Gateway 125. The MME 113 may be in communication with a Home Subscriber Server (HSS) 127. The MME 113 is the control node that processes the signaling between the UEs 104 and the EPC 111. Generally, the MME 113 provides bearer and connection management. All user Internet protocol (IP) packets are transferred through the Serving Gateway 117, which is connected to the PDN Gateway 125. The PDN Gateway 125 provides UE IP address allocation as well as other functions. The PDN Gateway 125 and the BM-SC 123 are connected to the IP Services 129. The IP Services 129 may include the Internet, an intranet, an IP Multimedia Subsystem (IMS), a PS Streaming Service, and/or other IP services. The BM-SC 123 may provide functions for MBMS user service provisioning and delivery. The BM-SC 123 may serve as an entry point for content provider MBMS transmission, may be used to authorize and initiate MBMS Bearer Services within a public land mobile network (PLMN), and may be used to schedule MBMS transmissions. The MBMS Gateway 119 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include one or more Access and Mobility Management Functions (AMFs), a Session Management Function (SMF), and a User Plane Function (UPF). In an example, the AMF may be in communication with a Unified Data Management (UDM). The AMF is the control node that processes the signaling between the UEs 104 and the 5GC 190. Generally, the AMF provides QoS flow and session management. All user Internet protocol (IP) packets are transferred through the UPF. The UPF provides UE IP address allocation as well as other functions. The UPF may be connected to the IP Services 129.

The base station 102 may also be referred to as a gNB, Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 111 and/or the 5GC 190 for one or more UEs 104. Examples of the UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
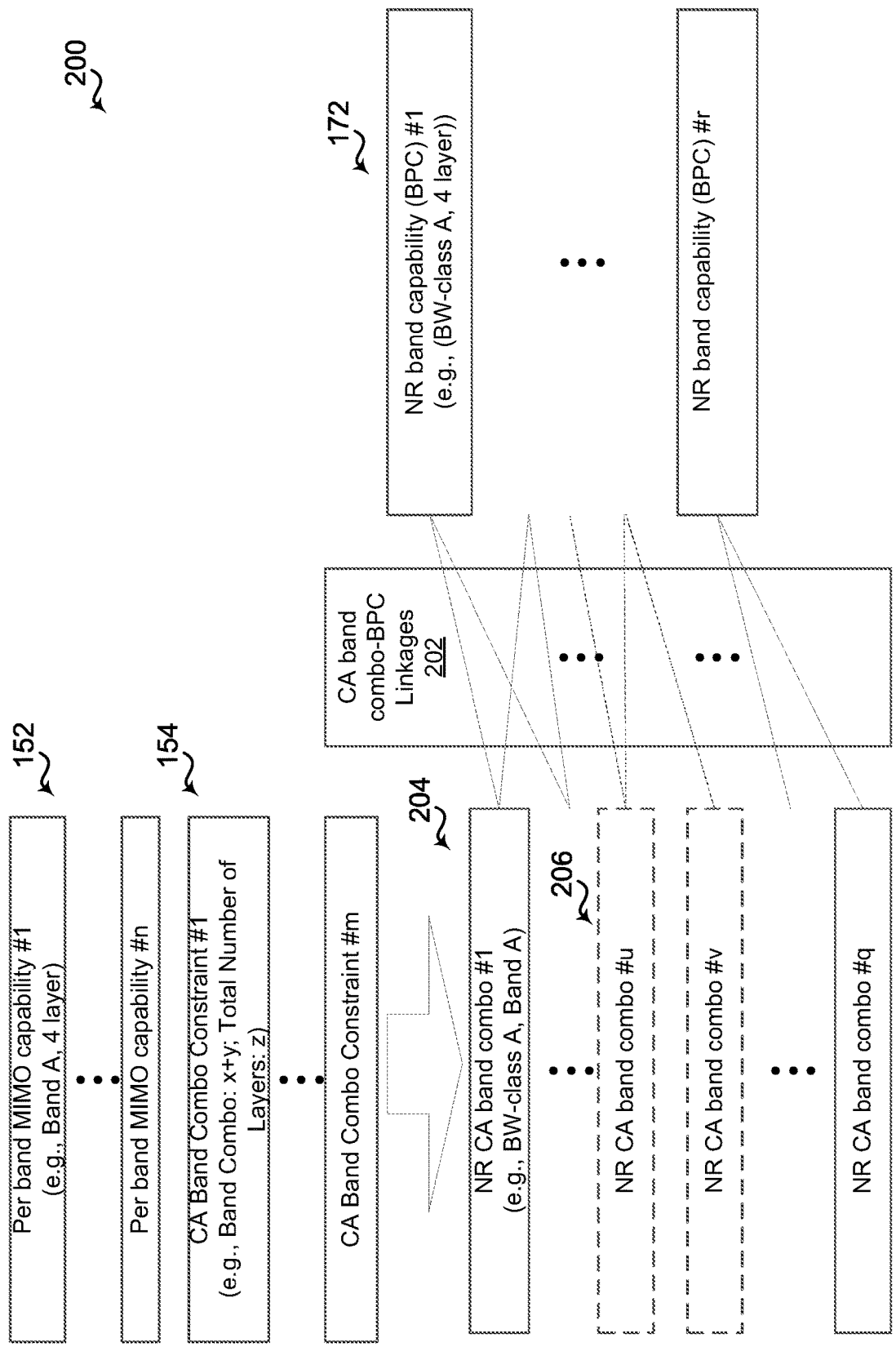
FIG. 2 is a schematic diagram of an example scheme of linking between new radio (NR) CA band combinations and NR band processing combinations (BPCs)

Referring to FIG. 2, in one example implementation of a scheme 200 of linking between NR CA band combinations and NR BPC, the UE configuration determiner component 170 of the base station 104 may identify one or more CA band combo-BPC linkages 202 between a plurality of usable UE CA band combinations 204 and the band capability information 172. As noted above, the UE configuration determiner component 170 of the base station 102 may receive the UE RF band capability information 152, such as but not limited to a set of up to n different per band MIMO capabilities, where n is a positive integer. For instance, each per band MIMO capability may include, but is not limited to, identification of a supported RF frequency band and a corresponding supported number of layers. Further, the UE configuration determiner component 170 of the base station 102 may receive the UE band combo constraint information 154, such as but not limited to a set of up to m different CA band combination constraints, where m is a positive integer. For instance, each CA band combination constraints may include, but is not limited to, identification of a CA band combination and a corresponding total number of layers. Based on these two sets of information, the UE configuration determiner component 170 of the base station 102 can determine the plurality of usable UE CA band combinations 204, such as but not limited to a set of up to q different NR CA band combinations, where q is a positive integer. For instance, each NR CA band combination may include, but is not limited to, identification of a BW class and a corresponding frequency band.

As noted above, the plurality of usable UE CA band combinations 204 may be less than a total number of possible permutations of CA band combinations represented by the UE RF band capability information 152. For instance, the UE configuration determiner component 170 of the base station 102 can determine one or more incompatible CA band combinations 206, illustrated in this case as "NR CA band combo # u" and "NR CA band combo # v." These may include two or more CA band combinations of which only one can be used at a given time due to UE RF limitations, which may be defined in the UE band combo constraint information 154.

In any case, the UE configuration determiner component 170 of the base station 102 can further receive or determine the band capability information 172, such as but not limited to a set of up to r different NR BPC capabilities, where r is a positive integer. For instance, each NR BPC capability may include, but is not limited to, identification of a BW class and a corresponding number of layers.

Further, the UE configuration determiner component 170 evaluates mappings between one or more of the plurality of usable UE CA band combinations 204 and one or more of the plurality of NR BPC capabilities to determine the CA band combo-BPC linkages 202. Based on the determined CA band combo-BPC linkages 202, the UE configuration determiner component 170 can configure the UE 104 for communications, such as by sending the UE configuration 174, such as but not limited to a radio resource control (RRC) configuration, which identifies a selected one or more pairings of the plurality of usable UE CA band combinations 204 and the plurality of NR BPC capabilities.

Figure 3:
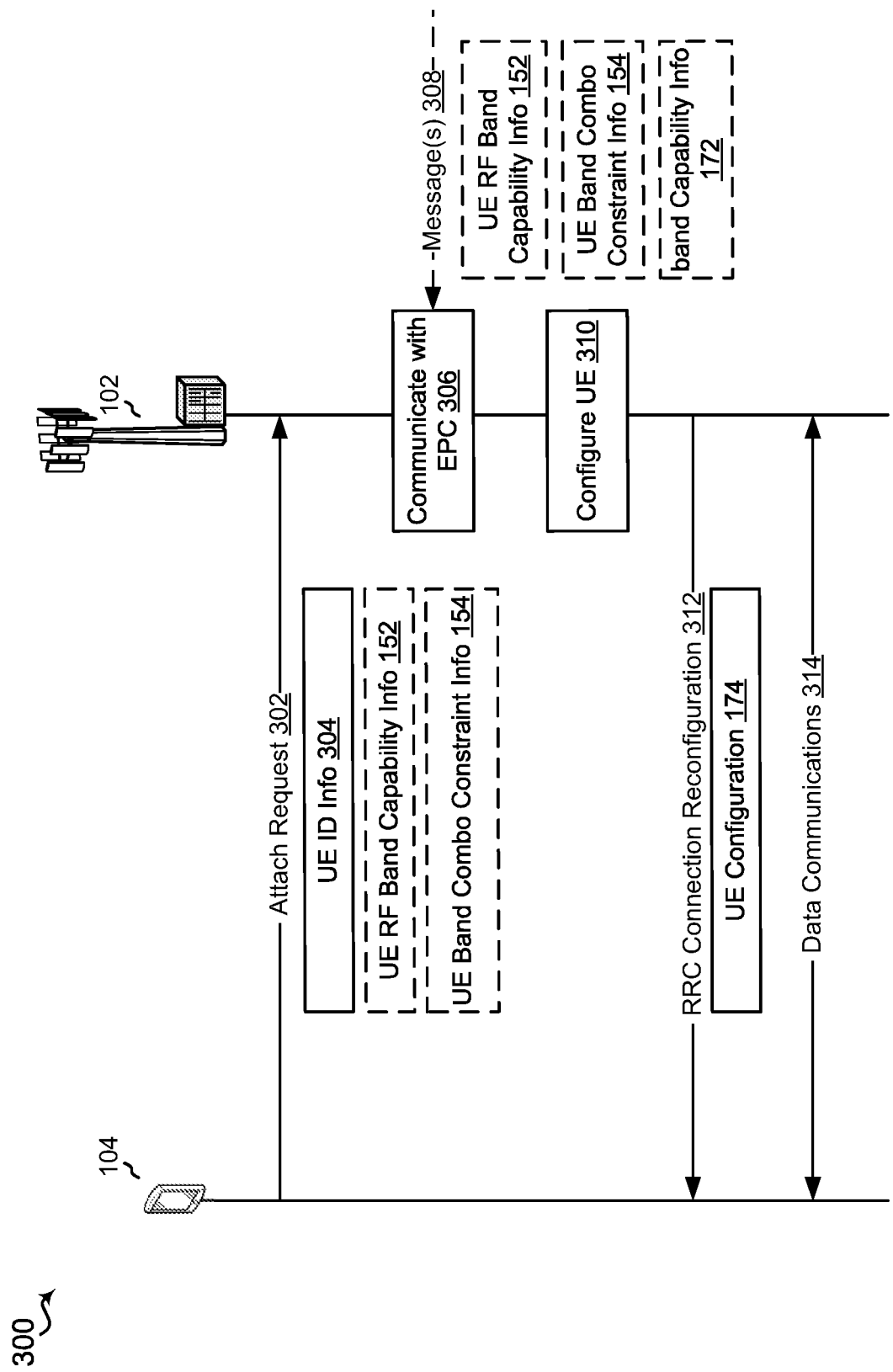
FIG. 3 is a message flow diagram of an example method of operation of the UE and base station of FIG. 1.

Referring to FIG. 3, in one example of a message exchange 300 where the UE 104 is configured by the base station 102 based on the UE band combo constraint information 154, the UE 104 may initiate communications, such as initiating an attach procedure after discovering that the UE 104 is within the coverage area of the base station 102. For example, the UE 104 may transmit an attach request 302, which may include UE identification (ID) information 304, such as at least a unique identifier associated with the UE 104. Further, in some implementations, the UE 104 may further transmit the UE band combination constraint information 154 and/or the UE RF band capability information 152, as described above. Specifically, in one implementation, in the attach request 302 or in one or more subsequent transmissions, the UE 104 can signal the UE band combination constraint information 154 in the form of a total number of layers supported in a CA band combination for each CA band combination supported by the UE 104, which reflects UE RF implementation limitations. This limitation also applies when those bands are combined with other bands to form a bigger CA band combination. In response, at 306, the base station 102 may communicate with one or more components of the EPC 111 and/or the 5GC 190 such as to verify the identity of the UE 104, obtain a UE context, perform location updates, re-establish or setup new sessions/bearers, and/or otherwise obtain information for generating the UE configuration 174 at 310. For example, the UE configuration 174 may include the one or more CA band combo-BPC linkages 202, as described above with regard to FIG. 2.

Even though one example implementation utilizes signalling from the UE 104 to provide the base station 102 with the UE band combination constraint information 154 and/or the UE RF band capability information 152, in some examples the base station 102 may acquire this information in other manners, such as via preconfigured information stored in a memory of the base station 102 or retrieved by the base station 102 via one or more messages 308 with the EPC 111 and/or the 5GC 190. For instance, the messages 308 may include one or more of the UE RF band capability information 152, the UE band combination constraint information 154, and/or the band capability information 172, based on the received UE ID information 304.

Alternatively, or in addition, at 310, the base station 102 may utilize a rule, for generating the UE configuration 174, that a given BPC is applicable to CA band combinations that include bands: 1) with equal or higher BW class per band combination, 2) with equal or higher MIMO layer capability per band, and 3) with equal or higher MIMO layer capability per (sub)-band combination when applicable.

In any case, the base station 102 may transmit an RRC reconfiguration message 312 to the UE 104, including the UE configuration 174. In response, the UE 104 configures itself according to the UE configuration 174 and establishes one or more data communications 314 with the base station 102. The one or more data communications 314 therefore take into account the UE band combination constraint information 154.

Figure 4:
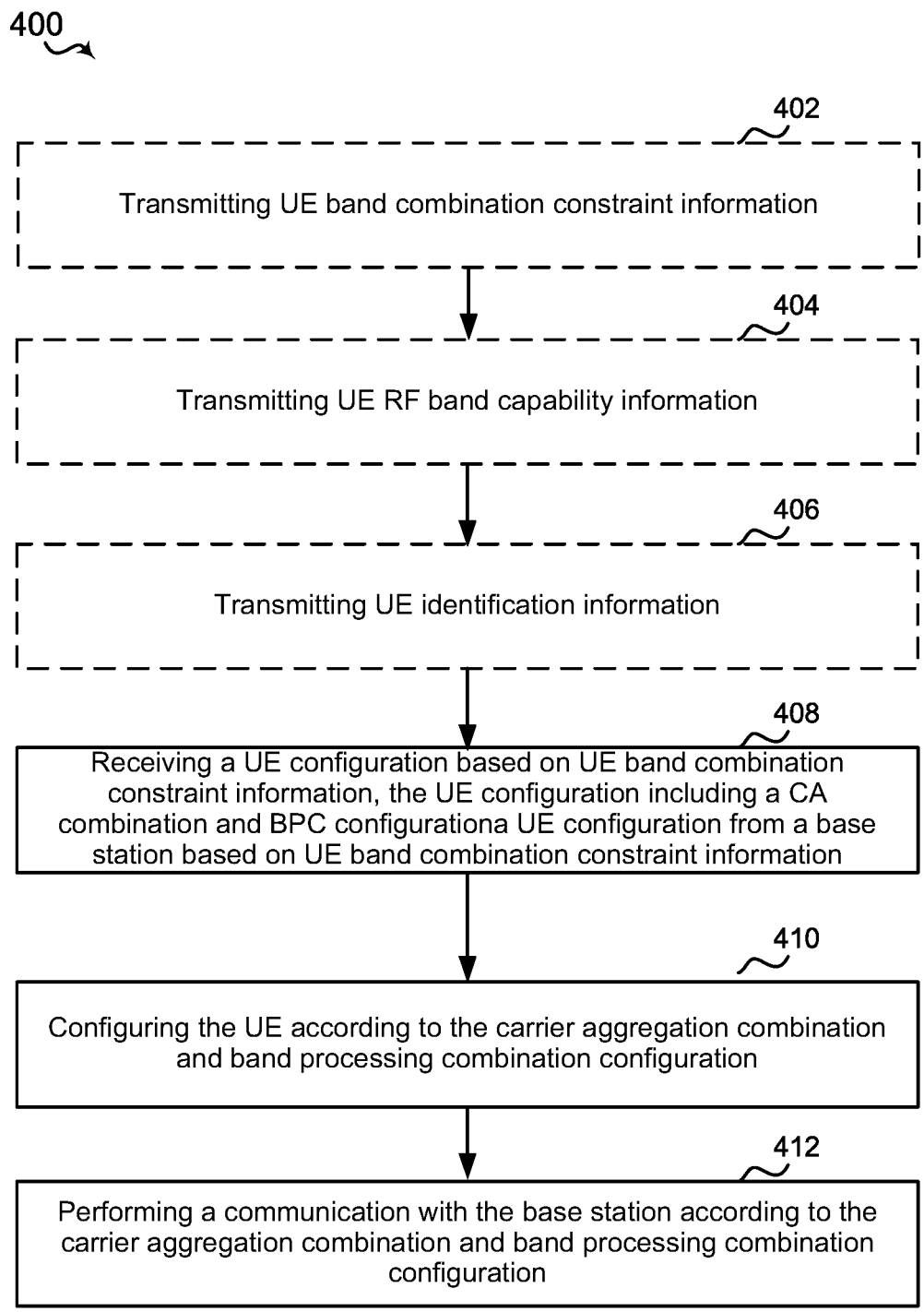
FIG. 4 is a flow diagram of an example method of wireless communication by the UE of FIG. 1 according to the present disclosure.

Referring to FIG. 4, an example method 400 of wireless communication in operating the UE 104 according to the above-described aspects may include one or more of the herein-defined actions, such as to reduce signaling and to take into account UE RF limitations when linking between, for example, NR CA band combinations and NR BPC. The method 400 is discussed below in combination with the elements previously discussed in FIGS. 1-3, and/or with the architecture of the UE 104 described further below in FIG. 6.

For example, at 402, the method 400 optionally includes transmitting UE band combination constraint information. For instance, in an aspect, the UE 104 may execute the communications component 150 to transmit the UE band combination constraint information 154 to the base station 102, as described herein. In one implementation, for example, the UE band combination constraint information 154 includes a total number of layers supported in a CA band combination, for one or more CA combinations.

At 404, the method 400 optionally includes transmitting UE RF band capability information. For instance, in an aspect, the UE 104 may operate one or more of the modem 140, the processor 1212, or a transceiver 1202 to execute the communications component 150 to transmit the UE RF band capability information 152, as described herein. In one implementation, for example, the UE RF band capability information 152 includes information on MIMO capability per component carrier of the UE 104 for one or more bands.

At 406, the method 400 optionally includes transmitting, to the base station, UE identification information, wherein receiving the UE configuration is in response to the transmitting of the UE identification information. For instance, in an aspect, the UE 104 may operate one or more of the modem 140, the processor 1212, or a transceiver 1202 to execute the communications component 150 to transmit UE identification information 304, as described herein.

At 408, the method 400 includes receiving, at a modem of the UE from a base station, a UE configuration based on UE band combination constraint information, the UE configuration including a CA combination and BPC configuration. For instance, in an aspect, the UE 104 may operate one or more of the modem 140, the processor 1212, or the transceiver 1202 to execute the communications component 150 to receive the UE configuration 174 from the base station 102 based on the UE band combination constraint information 154, as described herein. The UE configuration 174 may include a CA combination and a BPC configuration that is usable by the UE 104 based on taking into account the UE band combination constraint information 154. In an implementation, the UE configuration 174 may be defined by or included in the RRC connection reconfiguration message 312.

At 410, the method 400 includes configuring the UE, by a processor of the UE, according to the carrier aggregation combination and BPC configuration. For instance, in an aspect, the UE 104 may operate one or more of the modem 140, the processor 1212, or the transceiver 1202 to execute the communications component 150 to configure the UE 104 according to the carrier aggregation combination and BPC configuration of the UE configuration 174, as described herein.

At 412, the method 400 includes performing a communication with the base station, via the modem of the UE, according to the carrier aggregation combination and BPC configuration. For instance, in an aspect, the UE 104 may operate one or more of the modem 140, the processor 1212, or the transceiver 1202 to execute the communications component 150 to perform a communication with the base station 102 according to the UE configuration 174, as described herein.

Figure 5:
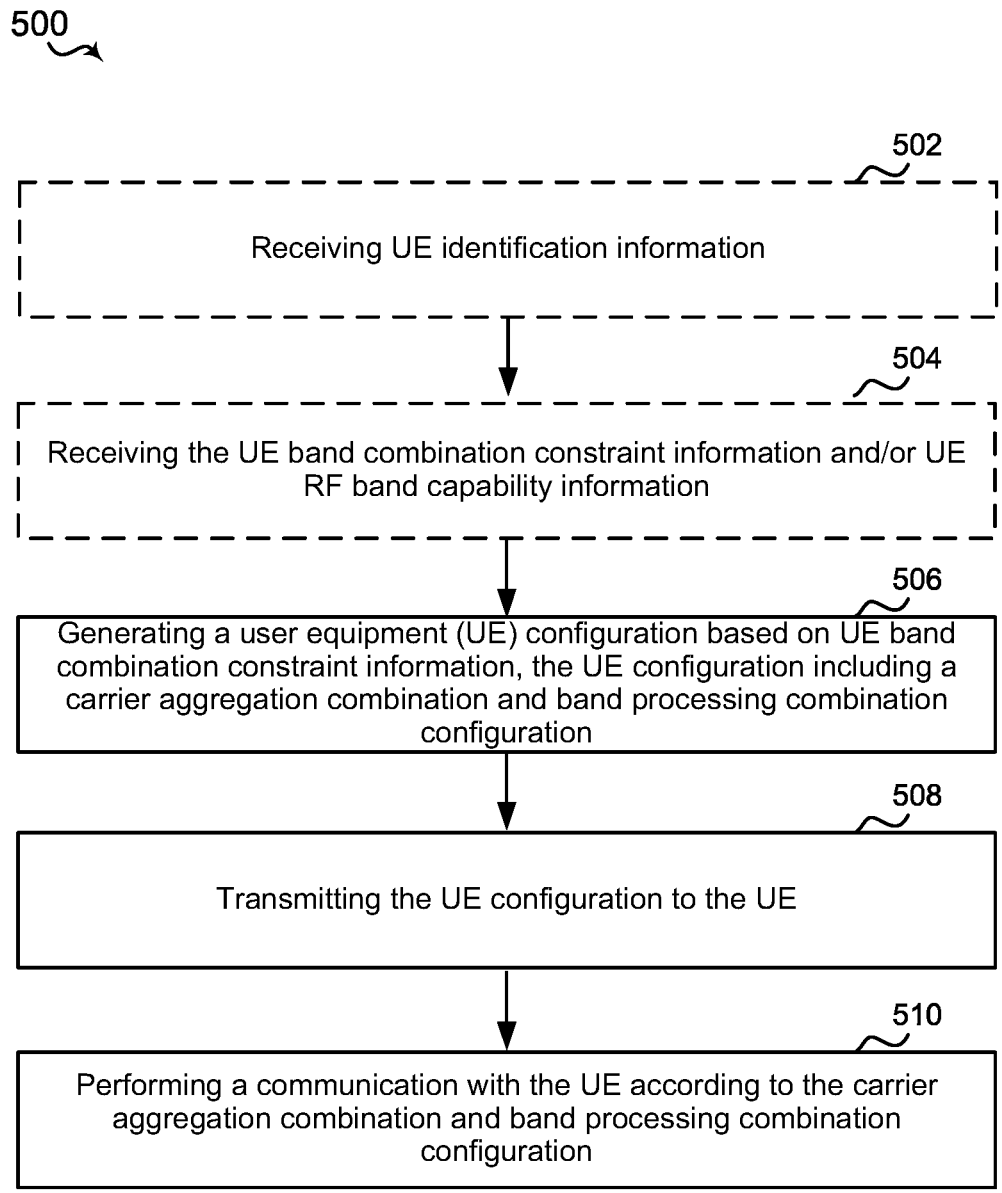
FIG. 5 is a flow diagram of an example method of wireless communication by the base station of FIG. 1 according to the present disclosure.

Referring to FIG. 5, for example, a method 500 of wireless communication in operating the base station 102 according to the above-described aspects may include one or more of the herein-defined actions, such as to reduce signaling and to take into account UE RF limitations when linking between, for example, NR CA band combinations and NR BPC. The method 500 is discussed below in combination with the elements previously discussed in FIGS. 1-3, and/or with the architecture of the base station 102 described further below in FIG. 7.

For example, at 502, the method 500 optionally includes receiving UE identification information. For instance, in an aspect, the base station 102 may operate one or more of the modem 160, the processor 1312, or the transceiver 1302 to execute the UE configuration determiner component 170 to receive the UE identification information 304, as described herein.

At 504, the method 500 optionally includes receiving the UE band combination constraint information and/or UE RF band capability information. For instance, in an aspect, the base station 102 may the operate one or more of the modem 160, the processor 1312, or the transceiver 1302 to execute the UE configuration determiner component 170 to receive the UE band combination constraint information 154 and/or the UE RF band capability information 152, as described herein. For example, such information may be received from signaling by the UE 104, accessed from preconfigured information in the memory 1316, or obtained from one or more components of the EPC 111 and/or the 5GC 190 based on the received the UE ID information 304. In one implementation, for example, the UE band combination constraint information 154 includes a total number of layers supported in a CA band combination, for one or more CA combinations. In one implementation, for example, the UE RF band capability information 152 includes information on MIMO capability per component carrier of the UE 104 for one or more bands.

At 506, the method 500 includes generating a UE configuration based on UE band combination constraint information, the UE configuration including a CA combination and BPC configuration. For instance, in an aspect, the base station 102 may operate one or more of the modem 160, the processor 1312, or the transceiver 1302 to execute the UE configuration determiner component 170 to generate the UE configuration 174 based on the UE band combination constraint information 154, as described herein. The UE configuration 174 may include a CA combination and BPC configuration that is usable by the UE 104 based on taking into account the UE band combination constraint information 154. In one implementation, the UE configuration determiner component 170 determines each CA combination and BPC configuration that is usable by the UE 104. For example, the UE configuration determiner component 170 evaluates mappings between one or more of the plurality of usable UE CA band combinations 204 and one or more of the plurality of NR BPC capabilities to determine the CA band combo-BPC linkages 202. Based on the determined CA band combo-BPC linkages 202, the UE configuration determiner component 170 may generate the UE configuration 174 to configure the UE 104 for communications.

At 508, the method 500 includes transmitting the UE configuration to the UE. For instance, in an aspect, the base station 102 may operate the modem 160, the processor 1312, or the transceiver 1302 to execute the UE configuration determiner component 170 to transmit the UE configuration 174 to the UE 104, as described herein. In an implementation, the UE configuration 174 may be defined by or included in the RRC connection reconfiguration message 312, and as noted above, may take into account UE RF limitations when defining CA band combinations and BPCs.

At 510, the method 500 includes performing a communication with the UE according to the carrier aggregation combination and BPC configuration. For instance, in an aspect, the base station 102 may execute one or more of the modem 160, the processor 1312, or the transceiver 1302 to perform a communication with the UE 104 according to the CA combination and BPC configuration of the UE configuration 174, as described herein.

Figure 6:
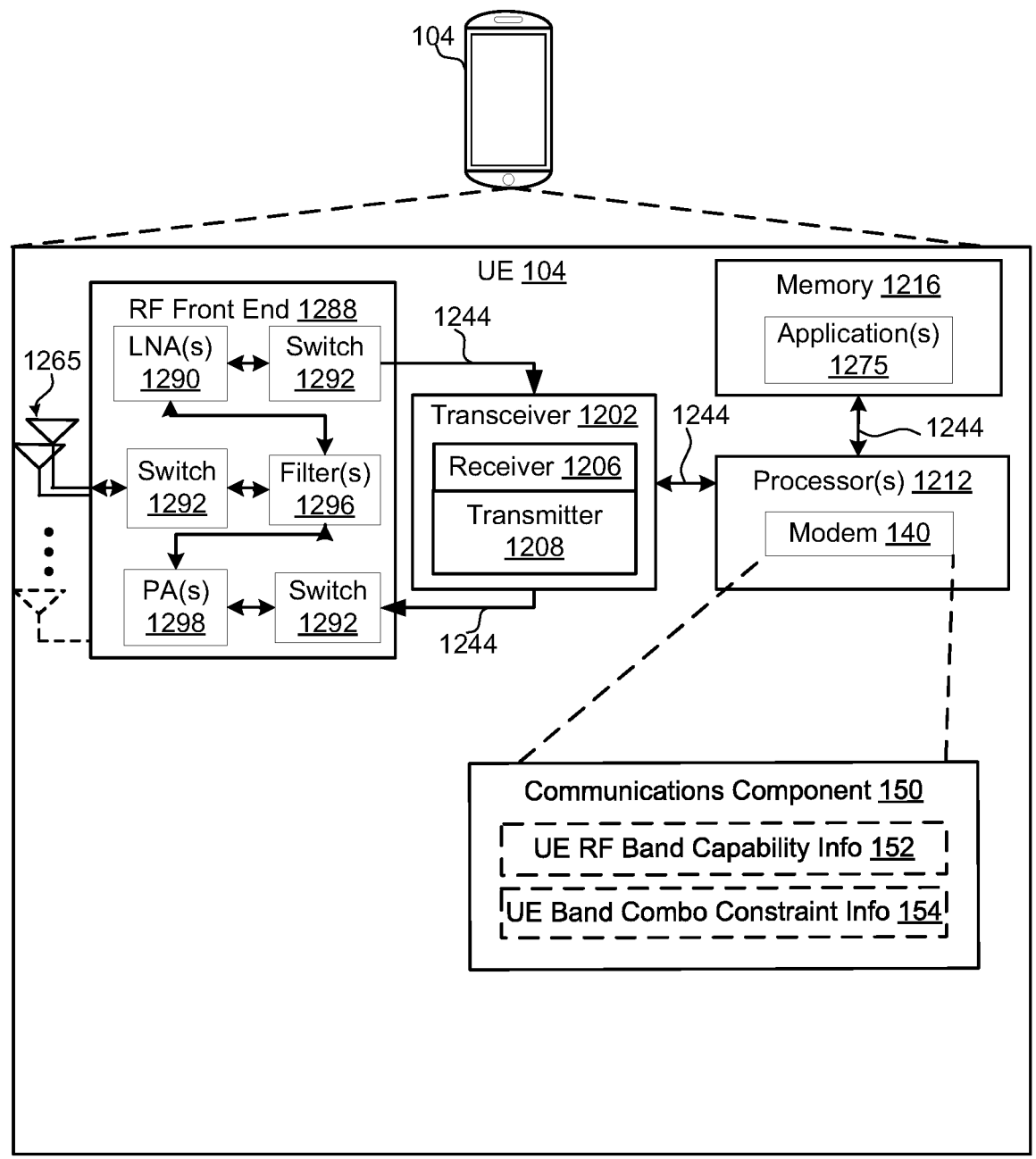
FIG. 6 is a schematic diagram of example components of the UE of FIG. 1.

Referring to FIG. 6, one example of an implementation of the UE 104 may include a variety of components, some of which have already been described above, but including components such as one or more processors 1212 and memory 1216 and the transceiver 1202 in communication via one or more buses 1244, which may operate in conjunction with the modem 140 and the communications component 150 to enable one or more of the functions described herein related to reducing signaling and/or taking into account UE RF limitations when linking between, for example, NR CA band combinations and NR BPC. Further, the one or more processors 1212, the modem 1214, the memory 1216, the transceiver 1202, an RF front end 1288 and one or more antennas 1265, may be configured to support voice and/or data calls (simultaneously or non-simultaneously) in one or more radio access technologies.

In an aspect, the one or more processors 1212 can include the modem 140 that uses one or more modem processors. The various functions related to the communications component 150 may be included in the modem 140 and/or the processors 1212 and, in an aspect, can be executed by a single processor, while in other aspects, different ones of the functions may be executed by a combination of two or more different processors. For example, in an aspect, the one or more processors 1212 may include any one or any combination of a modem processor, or a band processor, or a digital signal processor, or a transmit processor, or a receiver processor, or a transceiver processor associated with the transceiver 1202. In other aspects, some of the features of the one or more processors 1212 and/or the modem 140 associated with the communications component 150 may be performed by the transceiver 1202.

Also, the memory 1216 may be configured to store data used herein and/or local versions of applications 1275 or the communications component 150 and/or one or more of its subcomponents being executed by at least one the processor 1212. The memory 1216 can include any type of computer-readable medium usable by a computer or at least one of the processors 1212, such as random access memory (RAM), read only memory (ROM), tapes, magnetic discs, optical discs, volatile memory, non-volatile memory, and any combination thereof. In an aspect, for example, the memory 1216 may be a non-transitory computer-readable storage medium that stores one or more computer-executable codes defining the communications component 150 and/or one or more of its subcomponents, and/or data associated therewith, when the UE 104 is operating at least one of the processors 1212 to execute the communications component 150 and/or one or more of its subcomponents.

The transceiver 1202 may include at least one receiver 1206 and at least one transmitter 1208. The receiver 1206 may include hardware, firmware, and/or software code executable by a processor for receiving data, the code comprising instructions and being stored in a memory (e.g., computer-readable medium). The receiver 1206 may be, for example, a radio frequency (RF) receiver. In an aspect, the receiver 1206 may receive signals transmitted by at least one of the base stations 102. Additionally, the receiver 1206 may process such received signals, and also may obtain measurements of the signals, such as, but not limited to, Ec/Io, SNR, RSRP, RSSI, etc. The transmitter 1208 may include hardware, firmware, and/or software code executable by a processor for transmitting data, the code comprising instructions and being stored in a memory (e.g., computer-readable medium). A suitable example of the transmitter 1208 may including, but is not limited to, an RF transmitter.

Moreover, in an aspect, the UE 104 may include the RF front end 1288, which may operate in communication with one or more of the antennas 1265 and the transceiver 1202 for receiving and transmitting radio transmissions, for example, wireless communications transmitted by at least one of the base stations 102 or wireless transmissions transmitted by the UE 104. The RF front end 1288 may be connected to one or more of the antennas 1265 and can include one or more low-noise amplifiers (LNAs) 1290, one or more switches 1292, one or more power amplifiers (PAs) 1298, and one or more filters 1296 for transmitting and receiving RF signals, and/or one or more other components such as one or more diplexers.

In an aspect, the LNA 1290 can amplify a received signal at a desired output level. In an aspect, each LNA 1290 may have a specified minimum and maximum gain values. In an aspect, the RF front end 1288 may use one or more switches 1292 to select a particular LNA 1290 and its specified gain value based on a desired gain value for a particular application.

Further, for example, one or more PA(s) 1298 may be used by the RF front end 1288 to amplify a signal for an RF output at a desired output power level. In an aspect, each PA 1298 may have specified minimum and maximum gain values. In an aspect, the RF front end 1288 may use one or more switches 1292 to select a particular PA 1298 and its specified gain value based on a desired gain value for a particular application.

Also, for example, one or more filters 1296 can be used by the RF front end 1288 to filter a received signal to obtain an input RF signal. Similarly, in an aspect, for example, a respective filter 1296 can be used to filter an output from a respective PA 1298 to produce an output signal for transmission. In an aspect, each filter 1296 can be connected to a specific LNA 1290 and/or PA 1298. In an aspect, the RF front end 1288 can use one or more switches 1292 to select a transmit or receive path using a specified filter 1296, LNA 1290, and/or PA 1298, based on a configuration as specified by the transceiver 1202 and/or the processor 1212.

As such, the transceiver 1202 may be configured to transmit and receive wireless signals through one or more of the antennas 1265 via the RF front end 1288. In an aspect, transceiver may be tuned to operate at specified frequencies such that the UE 104 can communicate with, for example, one or more of the base stations 102 or one or more cells associated with one or more of the base stations 102. In an aspect, for example, the modem 140 can configure the transceiver 1202 to operate at a specified frequency and power level based on the UE configuration 174 of the UE 104 and the communication protocol used by the modem 140.

In an aspect, the modem 140 can be a multiband-multimode modem, which can process digital data and communicate with the transceiver 1202 such that the digital data is sent and received using the transceiver 1202. In an aspect, the modem 140 can be multiband and be configured to support multiple frequency bands for a specific communications protocol. In an aspect, the modem 140 can be multimode and be configured to support multiple operating networks and communications protocols. In an aspect, the modem 140 can control one or more components of the UE 104 (e.g., RF front end 1288, transceiver 1202) to enable transmission and/or reception of signals from the network based on a specified modem configuration. In an aspect, the modem configuration can be based on the mode of the modem and the frequency band in use. In another aspect, the modem configuration can be based on the UE configuration 174 associated with the UE 104 as provided by the network during cell selection and/or cell reselection, an attach procedure, or any other communication with the base station 102.

Figure 7:
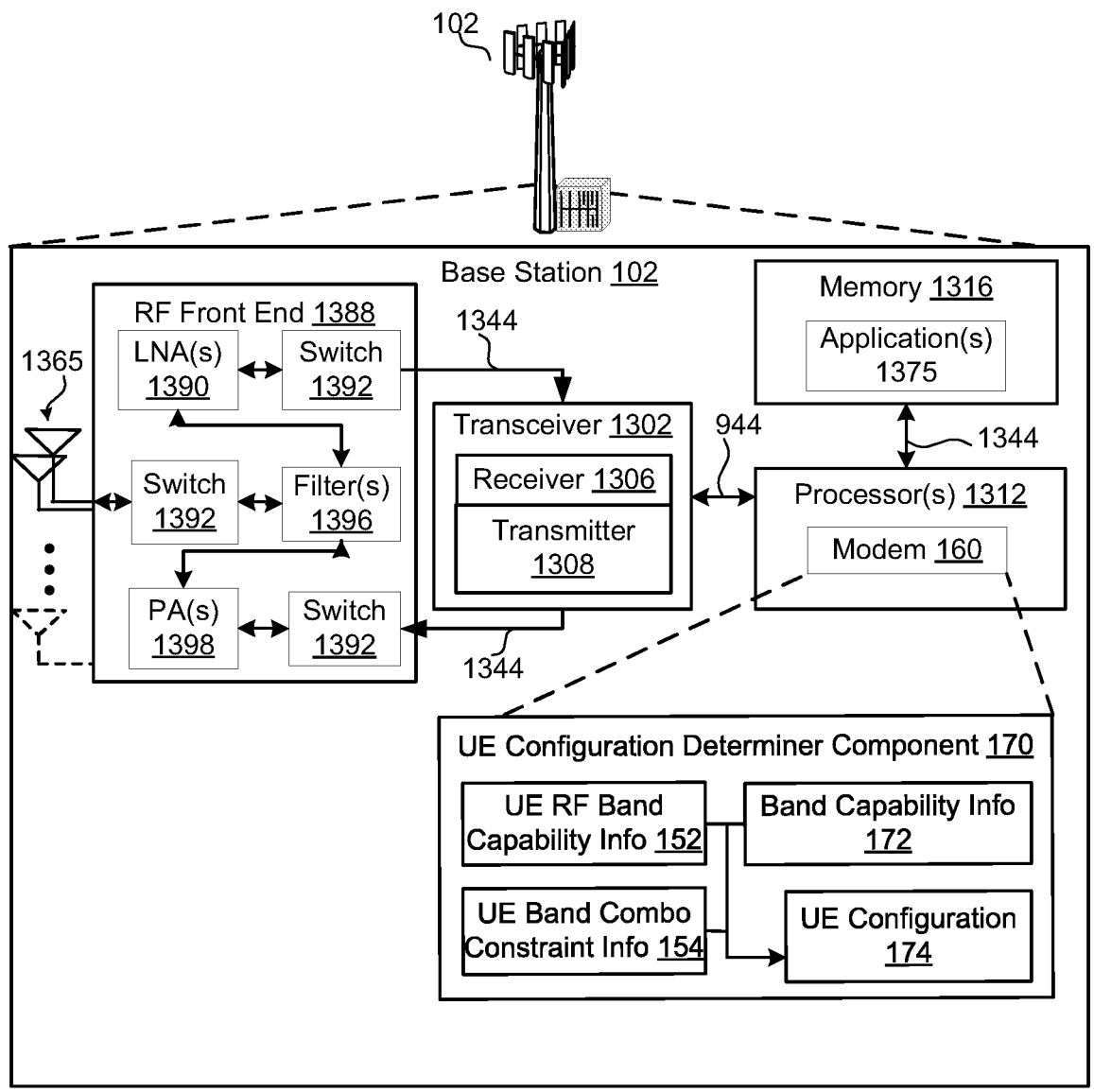
FIG. 7 is a schematic diagram of example components of the base station of FIG. 1.

Referring to FIG. 7, one example of an implementation of the base station 102 may include a variety of components, some of which have already been described above, but including components such as one or more of the processors 1312 and the memory 1316 and the transceiver 1302 in communication via one or more buses 1344, which may operate in conjunction with the modem 160 and the UE configuration determiner component 170 to enable one or more of the functions described herein related to reducing signaling and/or taking into account UE RF limitations when linking between, for example, NR CA band combinations and NR BPC.

The transceiver 1302, receiver 1306, transmitter 1308, one or more processors 1312, the memory 1316, applications 1375, buses 1344, RF front end 1388, LNAs 1390, switches 1392, filters 1396, PAs 1398, and one or more antennas 1365 may be the same as or similar to the corresponding components of the UE 104, as described above, but configured or otherwise programmed for base station operations as opposed to UE operations.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method of wireless communications by a user equipment (UE), comprising:
   receiving, at a modem of the UE from a base station, a UE configuration based on UE band combination constraint information, the UE configuration including a carrier aggregation combination and band processing combination configuration;
   configuring the UE, by a processor of the UE, according to the carrier aggregation combination and band processing combination configuration; and
   performing a communication with the base station, via the modem of the UE, according to the carrier aggregation combination and band processing combination configuration.

2. The method of claim 1, further comprising:
   transmitting the UE band combination constraint information to the base station, wherein receiving the UE configuration is in response to the transmitting of the UE band combination constraint information.

3. The method of claim 2, wherein transmitting the UE band combination constraint information further comprises transmitting, to the base station, a total number of layers supported in a carrier aggregation band combination.

4. The method of claim 1, further comprising:
   transmitting UE radio frequency (RF) band capability information to the base station, wherein the UE configuration is further based on the UE RF band capability information.

5. The method of claim 4, wherein transmitting the UE RF band capability information further comprises transmitting, to the base station, information on multiple input multiple output (MIMO) capability per component carrier.

6. The method of claim 1, further comprising:
   transmitting UE identification information to the base station, wherein receiving the UE configuration is in response to the transmitting of the UE identification information.

7. A wireless communication device, comprising:
   a modem;
   a memory storing instructions; and
   a processor in communication with the modem and the memory, wherein the processor is configured to execute the instructions to:
      receive, at the modem from a base station, a user equipment (UE) configuration based on UE band combination constraint information, the UE configuration including a carrier aggregation combination and band processing combination configuration;
      configure the UE according to the carrier aggregation combination and band processing combination configuration; and
      perform a communication with the base station, via the modem, according to the carrier aggregation combination and band processing combination configuration.

8. The wireless communication device of claim 7, wherein the processor is further configured to execute the instructions to:
   transmit the UE band combination constraint information to the base station, wherein the UE configuration is received in response to the UE band combination constraint information being transmitted.

9. The wireless communication device of claim 8, wherein the processor is further configured to execute the instructions to:
   transmit, to the base station, a total number of layers supported in a carrier aggregation band combination.

10. The wireless communication device of claim 7, wherein the processor is further configured to execute the instructions to:
    transmit UE radio frequency (RF) band capability information to the base station, wherein the UE configuration is further based on the UE RF band capability information.

11. The wireless communication device of claim 10, wherein the processor is further configured to execute the instructions to:
    transmit, to the base station, information on multiple input multiple output (MIMO) capability per component carrier.

12. The wireless communication device of claim 7, wherein the processor is further configured to execute the instructions to:
    transmit UE identification information to the base station, wherein the UE configuration is received in response to the UE identification information being transmitted.

13. A method of wireless communications by a base station, comprising:
    generating, at a processor of the base station, a user equipment (UE) configuration based on UE band combination constraint information, the UE configuration including a carrier aggregation combination and band processing combination configuration;
    transmitting the UE configuration, via a modem of the base station, to the UE; and
    performing a communication with the UE, via the modem of the base station, according to the carrier aggregation combination and band processing combination configuration.

14. The method of claim 13, further comprising:
    receiving the UE band combination constraint information, wherein the UE configuration is generated in response to the UE band combination constraint information being received.

15. The method of claim 14, wherein the UE band combination constraint information is received from signaling by the UE.

16. The method of claim 14, wherein the UE band combination constraint information is received from an evolved packet core.

17. The method of claim 14, wherein receiving the UE band combination constraint information further comprises receiving a total number of layers supported in a carrier aggregation band combination.

18. The method of claim 13, further comprising receiving UE radio frequency (RF) band capability information, wherein generating the UE configuration further comprises generating the UE configuration based on the UE RF band capability information.

19. The method of claim 18, wherein receiving the UE RF band capability information further comprises receiving information on multiple input multiple output (MIMO) capability per component carrier.

20. The method of claim 13, further comprising:
receiving UE identification information from the UE, wherein the UE configuration is generated in response to the receiving of the UE identification information.

21. A wireless communication device, comprising:
a modem;
a memory storing instructions; and
a processor in communication with the modem and the memory, wherein the processor is configured to execute the instructions to:
generate a user equipment (UE) configuration based on UE band combination constraint information, the UE configuration including a carrier aggregation combination and band processing combination configuration;
transmit the UE configuration to the UE; and
perform a communication with the UE according to the carrier aggregation combination and band processing combination configuration.

22. The wireless communication device of claim 21, wherein the processor is further configured to execute the instructions to:
receive the UE band combination constraint information, wherein the UE configuration is generated in response to the UE band combination constraint information being received.

23. The wireless communication device of claim 22, wherein the UE band combination constraint information is received signaling from the UE.

24. The wireless communication device of claim 22, wherein the UE band combination constraint information is received from an evolved packet core.

25. The wireless communication device of claim 22, wherein the processor is further configured to execute the instructions to:
receive a total number of layers supported in a carrier aggregation band combination.

26. The wireless communication device of claim 21, wherein the processor is further configured to execute the instructions to:
receive UE radio frequency (RF) band capability information, wherein the UE configuration is generated based on the UE RF band capability information.

27. The wireless communication device of claim 26, wherein the processor is further configured to execute the instructions to:
receive information on multiple input multiple output (MIMO) capability per component carrier.

28. The wireless communication device of claim 21, wherein the processor is further configured to execute the instructions to:
receive UE identification information from the UE, wherein the UE configuration is generated in response to the receiving of the UE identification information.

* * * * *